United States Patent [19]

Sato et al.

[11] Patent Number: 5,391,843
[45] Date of Patent: Feb. 21, 1995

[54] SYSTEM FOR MEASURING CARRYING WEIGHT OF VEHICLE

[75] Inventors: Hideo Sato; Takao Nagai, both of Kanagawa, Japan

[73] Assignee: Kabushiki Kaisha Komatsu Seisakusho, Tokyo, Japan

[21] Appl. No.: 946,487
[22] PCT Filed: May 7, 1991
[86] PCT No.: PCT/JP91/00606
§ 371 Date: Nov. 9, 1992
§ 102(e) Date: Nov. 9, 1992
[87] PCT Pub. No.: WO91/17413
PCT Pub. Date: Nov. 14, 1991

[30] Foreign Application Priority Data

May 7, 1990 [JP] Japan ................ 2-117076

[51] Int. Cl.⁶ .............. G01G 19/10; G01G 19/02; G01G 19/40
[52] U.S. Cl. ................ 177/141; 177/146; 177/25.14
[58] Field of Search ........ 177/136, 137, 141, 146, 177/25.15; 172/146, 25.14

[56] References Cited

U.S. PATENT DOCUMENTS

| 4,588,038 | 5/1986 | Takagi | 177/141 |
| 4,630,227 | 12/1986 | Hagenbuch | 177/141 X |
| 4,691,792 | 9/1987 | Shintani | 177/141 X |
| 4,835,719 | 5/1989 | Sorrells | 364/567 |
| 5,161,628 | 11/1992 | Wirth | 177/137 |

FOREIGN PATENT DOCUMENTS

| B45383 | 1/1986 | Australia . |
| B47300 | 1/1987 | Australia . |
| B12400 | 3/1989 | Australia . |
| B77696 | 10/1990 | Australia . |
| 58-7308 | 2/1963 | Japan . |
| 54-148562 | 11/1979 | Japan . |
| 60-161532 | 8/1985 | Japan . |
| 61-34425 | 2/1986 | Japan . |
| 1-131420 | 5/1989 | Japan . |
| WO90/13798 | 11/1990 | WIPO . |

OTHER PUBLICATIONS

63-187123, Dec. 1988 Patent Abstracts of Japan, vol. 12, No. 468, (P-797)(3315).

Primary Examiner—George H. Miller, Jr.
Attorney, Agent, or Firm—Varndell Legal Group

[57] ABSTRACT

An object of the present invention is to accurately measure a carrying weight of a vehicle on the basis of a force applied to suspension cylinders and allow an operator to accurately recognize the weight. A first force applied to a front wheel suspension cylinder of a vehicle carrying a load can be obtained on the basis of detection values of pressure sensors (2a, 3a, 2b, 3b), and a second force applied to a rear wheel suspension cylinder can be obtained on the basis of detection values of pressure sensors (2c, 3c, 2d, 3d). An inclination O of the vehicle in the longitudinal direction is detected by an inclinometer (8), and the first and the second force are corrected in accordance with this inclination O. Further, the first and the second force are corrected in accordance with the magnitudes of the first and the second force to thereby obtain the weights of the vehicles on the front wheel side and the rear wheel side. Then, the weight of a vacant vehicle is subtracted from the sum of the weight of the front wheel side and the weight on the rear wheel side, to thereby obtain the carrying weight. The carrying weight thus obtained is displayed on a display (24) screen in units varying in accordance with the change-over made by a switch (21).

6 Claims, 3 Drawing Sheets

SYSTEM FOR MEASURING CARRYING WEIGHT OF VEHICLE

TECHNICAL FIELD

The present invention relates to a system for measuring at a high accuracy carrying weight of a vehicle such as a dump truck in which a vehicle body is carried by suspension cylinders, and for recognizing the exact carrying weight of the vehicle.

BACKGROUND ART

A vehicle such as a dump truck is used for transporting rocks, ore, gravel, etc. In such a vehicle, it is very important to exactly detect weight of a load carried on the vehicle for the purpose of preventing the load weight from exceeding the rated value.

In recent years, a vehicle-install type load meter for measuring carrying weight of a vehicle has been developed. In the vehicle-installed type load meter, force acting on each of, e.g., four suspension cylinders is calculated by multiplying hydraulic pressure in each suspension cylinder with a cross-sectional area of the suspension cylinder. Based on the total of the force acting on the suspension cylinders, the weight of the vehicle in loaded state is obtained. Then, the carrying weight of the vehicle is determined by subtracting weight of the vehicle in a vacant state from the weight of the vehicle in the loaded state.

However, in the load meter of the above type in which the force acting on the four suspension cylinders are summed to determine the carrying weight of the vehicle, a measurement error arises when the vehicle inclines in the longitudinal direction, i.e., when the road surface is inclined in the direction in which the vehicle runs.

To prevent the measurement error, the inventors of this application proposed a system for exactly determining carrying weight of a vehicle in which inclination of the road surface is successively detected by using an inclinometer and force acting on each suspension cylinder is corrected according to the value detected by the inclinometer.

In the proposed system, the carrying weight measured by the vehicle-installed type load meter is displayed on the screen of a display device mounted on the vehicle. Thus, an operator can perform work while confirming the current carrying weight on the screen of the display unit.

As causes for degrading the accuracy in measuring of the carrying weight of a vehicle, the following facts have been found. Namely, for a vehicle having a rigid type suspension system, measurement accuracy does not become degraded significantly. However, for a vehicle using suspension cylinders in the suspension system, carrying load weight acting on the front wheel side differs from that acting on the rear wheel side depending on the magnitude of the load weight. This difference arises due to the difference in supporting system for each suspension cylinder on the front wheel side and the rear wheel side. As a result, when the vehicle weight is obtained based on force acting on each suspension cylinder, the obtained vehicle weight is greatly influenced by the magnitude of the load weight, thus resulting in measurement error. The influence due to the magnitude of the load weight varies depending on manners of supporting the vehicle body to the vehicle axles using suspension cylinders.

In addition, the familiar unit in which the carrying weight is presented is often different from operator to operator. Thus, when one unit is adopted for the load weight, an operator familiar with a unit different from the adopted unit cannot exactly recognize the load weight on the vehicle.

The present invention has been made in consideration of the foregoing background. A first object of the present invention is to provide a system for measuring carrying weight of a vehicle using suspension cylinders capable of measuring load weight at a high accuracy regardless of manners of mounting the suspension cylinders on the vehicle. A second object of the present invention is to provide a system for measuring carrying weight of a vehicle capable of changing units of carrying weight so that the adopted unit is always familiar to an operator who operates the vehicle. Therefore, a measuring system according to the present invention enables operators to recognize an exact carrying weight of a vehicle.

DISCLOSURE OF THE INVENTION

According to one aspect of the present invention, there is provided a system for measuring carrying weight of a vehicle wherein a first force acting on front-wheel suspension cylinders of the loaded vehicle and a second force acting on rear-wheel suspension cylinders of the vehicle are detected to determine weight of the vehicle in the loaded state based on the detected first and second forces, and carrying weight of the vehicle is determined by subtracting weight of the vehicle in the vacant state from the weight of the vehicle in the loaded state, characterized in that the system comprises memory means for storing a first correction value for determining weight of the vehicle on the front wheel side based on the first force and a second correction value for determining weight of the vehicle on the rear wheel side based on the second force, means for reading from the memory means the first correction value corresponding to the first force and the second correction value corresponding to the second force, and correcting the first force and the second force with the first correction value and the second correction value so as to calculate the weight of the vehicle on the front wheel side and the weight of the vehicle on the rear wheel side, wherein sum of the weight of the vehicle on the front wheel side and the weight of the vehicle on the rear wheel side is recognized as weight of the vehicle in the loaded state so as to determine the carrying weight of the vehicle.

With such construction, the relationship between the first force acting on the suspension cylinders for the front wheels and the weight of the vehicle on the front wheel side as well as the relationship between the second force acting on the suspensions cylinders for the rear wheel side and the weight of the vehicle on the rear wheel side differ from each other depending on the kind of vehicle because of a difference between the front wheel side and the rear wheel side in respect of a manner of mounting each suspension cylinder on the vehicle. For this reason, the foregoing relationships are previously determined, and the first correction value for determining the weight of the vehicle on the front wheel side based on the first force corresponding to the magnitude of each first force and a second correction value for determining weight of the vehicle on the rear wheel side based on the second force corresponding to the magnitude of each second force are stored in the memory means. After the first force acting on the suspension cylinders for the front wheels and the second force acting on the suspension cylinders for the rear wheels are determined, both the first and second force are corrected with reference to both the first and second correction values stored in the memory means, whereby the weight of the vehicle on the front wheel side and the weight of the vehicle on the rear wheel side are determined. Thus, the carrying weight of the vehicle can be determined at a high accuracy in consideration of a manner of mounting each suspension cylinder on the vehicle as well as a magnitude of the carrying weight of the vehicle.

In addition, according to other aspect of the present invention, there is provided a system for measuring carrying weight of a vehicle wherein the carrying weight of the vehicle is measured by a vehicle-installed type load meter and the measured weight is displayed on the screen of a display device mounted on the vehicle, characterized in that the vehicle is provided with selecting means for selecting unit of weight and that the measured weight is displayed on the display device in the unit selected by the selecting means.

With such construction, a weight unit desired by an operator is selected by activating the selecting means. Thus, the carrying weight of the vehicle is displayed on the screen of the display device using the selected weight unit.

BEST MODE FOR CARRYING OUT THE INVENTION

Figure 2:
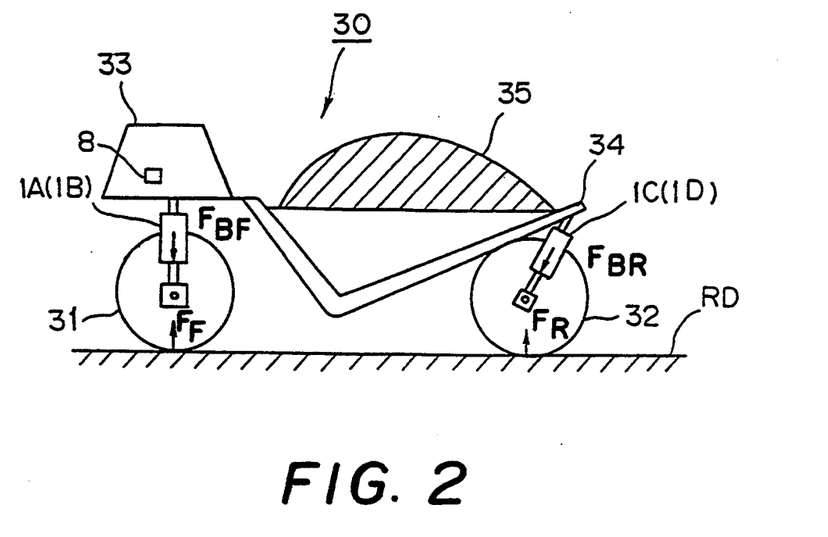
FIG. 2 is a schematic side view of the vehicle on which the system shown in FIG. 1 is mounted.

The present invention will now be described in detail hereinafter with reference to the accompanying drawings which illustrate a system for measuring carrying weight of a vehicle in accordance with an embodiment of the present invention. In this embodiment, as shown in FIG. 2, it is assumed that the vehicle is prepared in the form of a vehicle 30 such as a dump truck or the like wherein a frame 34 and front wheels 31 are supported by suspension cylinders 1A and 1B, while the frame 34 and rear wheels 32 are supported by suspensions cylinders 1C and 1D. Each of the suspension cylinders 1A and 1B is an upright standing type suspension cylinder of which shaft extends at a right angle relative to a road surface RD, while each of the suspension cylinders 1C and 1D is a non-upright standing type suspension cylinder of which shaft is rearwardly tilted at a predetermined angle relative to the road surface RD.

The suspension cylinder is prepared in the form of a hydropneumatic suspension cylinder having a spring property and a damping property. As shown in FIG. 2, four hydropneumatic suspensions cylinders, i.e., two hydropneumatic suspension cylinders for the front wheels 31 and two hydropneumatic suspension cylinders for the rear wheels 32 are arranged on the vehicle 30 so that the weight of a vehicle body is carried by the four hydropneumatic suspension cylinders 1A (front-/left), 1B (front/right), 1C (rear/left) and 1D (rear/-right).

Figure 5:
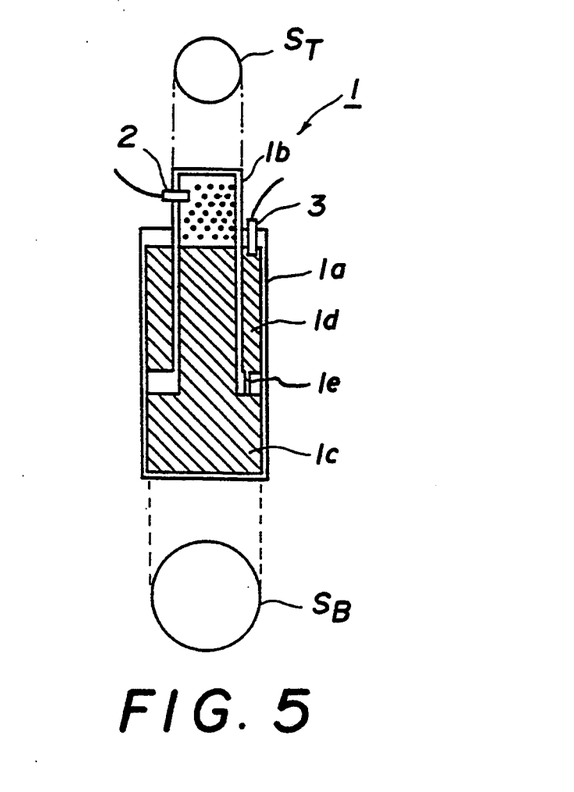
FIG. 5 is a sectional view of a suspension cylinder illustrating by way of example the structure of the suspension cylinder.

FIG. 5 is a sectional view of a suspension cylinder 1 which comprises a cylinder 1a and a piston 1b. The interior of the cylinder 1a is divided into two chambers with the piston 1b interposed therebetween, i.e., an inner chamber 1c defined by the cylinder 1a and an inner surface of the piston 1b and an outer chamber 1d defined by the cylinder 1a and an outer surface of the piston 1b. The inner chamber 1c and the outer chamber 1d are communicated with each other via an orifice 1e, and each chamber is filled with oil and gas.

Prior to sensing the weight of the vehicle, force acting on each of the four suspension cylinders 1A, 1B, 1C and 1D is measured. As shown in FIG. 5, in case that force WS acts on the piston 1b in the cylinder 1, when it is assumed that pressure (bottom pressure) in the inner chamber 1c is designated by $P_B$, pressure (top pressure) in the outer chamber 1d is designated by $P_T$, a cross-sectional area of the cylinder 1a is designated by $S_B$, a cross-sectional area of the piston 1b is designated by $S_T$ and resistance against slidable movement of the piston 1b along the inner wall surface of the cylinder 1a is designates by F, the foregoing force WS can be repressed by the following equation.

$$WS = P_B \times S_B - P_T(S_B - S_T) \pm F \quad (1)$$

While the suspension cylinder 1 is held in the static state, the bottom pressure $P_B$ and the top pressure $P_T$ are detected by pressure sensors 2 and 3. Thus, the force WS including the resistance F against slidable movement of the piston 1b is represented by the following equation.

$$WS = P_B \times S_B - P_T(S_B - S_T) \quad (2)$$

Next, inclination of the vehicle body as seen in the longitudinal direction will be discussed in the following. When the vehicle body is inclined such that e.g., the front wheels 31 are raised up on the assumption that the carrying weight is kept constant, the weight to be carried by the front wheel suspensions 1A and 1B is reduced compared with the case that the vehicle body runs on the horizontal plane, while the load to be carried by the rear wheel suspension cylinders 1C and 1D is enlarged. In the circumstances mentioned above, as illustrated by reference numerals 10 and 11 in FIG. 1, the force acting on the front and rear wheels 31 and 32 while the vehicle body is inclined in that way is converted into the force acting on them while the vehicle body runs on the horizontal plane by adding to the force acting on the front wheel suspension cylinders 1A and 1B and the rear wheel suspension cylinders 1C and 1D a front wheel inclination PF ($\theta$) and a rear wheel inclination PR ($\theta$) corresponding to the present inclination angle $\theta$ of the vehicle body in the longitudinal direction (the state that the front wheels are raised up is represented by a positive numeral).

With respect to inclination of the vehicle body as seen in the traverse direction, a difference of the force acting on the front wheel suspension cylinders 1A and 1B and the rear suspension cylinders 1C and 1D from the same at the time when the vehicle body runs on the horizontal plane can substantially be eliminated by adding the force acting on the front wheel suspension cylinders 1A and 1B to the force acting on the rear suspension cylinders 1C and 1D.

The foregoing elimination can be achieved by performing quantitative calculations in the following manner.

Figure 3:
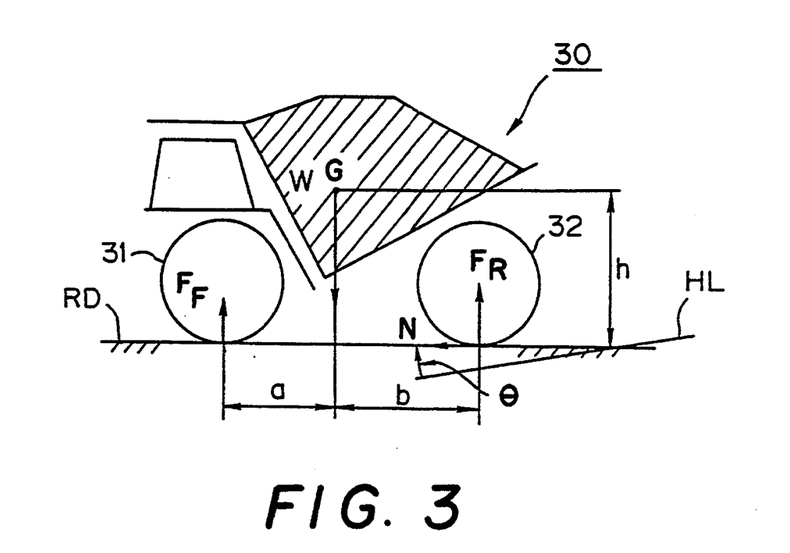
FIG. 3 is a schematic side view of the vehicle illustrating the geometrical relationship of the side of the vehicle, by which the principle applied to the embodiment is explained.

Referring to FIG. 3 which schematically shows the vehicle 30, it is assumed that weight of the vehicle is designated by W, a height as measured from the horizontal plane HL to a gravity center G of the vehicle is designated by h, a distance as measured from the gravity center G of the vehicle to a center of the front wheels 31 is designates by a, a distance as measured from the gravity center G of the vehicle to a center of the rear wheels 32 is designated by b, an inclination angle of the vehicle relative to the horizontal plane HL is designated by $\theta$ (in the state that the front wheels 31 are raised up), frictional force of the rear wheels 32 (appearing accompanied by slippage) is designated by N, a reactive force acting on the front wheels 31 from the road surface RD side, i.e., weight of the vehicle on the front wheel side is designated by $F_F$, and reactive force acting on each of the rear wheels 32 from the road surface RD side, i.e., weight of the vehicle on the rear wheel side is designated by $F_R$, it is obvious that the following equation is established with respect to the direction toward the road surface RD.

$$W \cos \theta = F_F + F_R \quad (3)$$

and that the following equation is established with respect to the direction perpendicular to the road surface RD.

$$W \sin \theta = N \quad (4)$$

Here, it is assumed that only the rear wheels 32 are braked and rolling friction appearing on each tire is negligibly small.

In addition, it is obvious that the following equation is established with respect to moment.

$$aF_F - bF_R + hN = 0 \quad (5)$$

Thus, the weight $F_F$ of the vehicle on the front wheel side and the weight $F_R$ of the vehicle on the rear wheel side are expressed in the following modified manner while the foregoing equations (3), (4) and (5) are incorporated therein.

$$F_F = (b \cos \theta - h \sin \theta)W/(a+b) \quad (6)$$

$$F_R = (a \cos \theta - h \sin \theta)W/(a+b) \quad (7)$$

Additionally, it is obvious that a ratio of the weight $F_F$ of the vehicle on the front wheel side at the time when the vehicle inclination angle $\theta$ is zero (at the time when the vehicle runs on the horizontal Diane so that an equation of $\theta=0$ is established) to the weight $F_F$ of the vehicle on the front wheel side at the time when the vehicle inclination angle assumes an arbitrary value is represented by the following equation.

$$F_F(\theta=0)/F_F = \{bW/(a+b)\}/\{(b \cos \theta - h \sin \theta)W/(a+b)\} \quad (8)$$

Since upstanding type suspension cylinders are employed for the front wheel side, the weight $F_F$ of the vehicle on the front wheel side coincides with the force $WS_F$ (represented by the equation (2)) acting on the suspension cylinders for the front wheels. In the circumstances as mentioned above, the following calculation is conducted under a condition that the ratio $F_F(\theta=0)/F_F$ represents a front wheel inclination correction coefficient $PF(\theta)$.

$$F_{BF} = PF(\theta) \times WS_F \quad (9)$$

On completion of the foregoing calculation, the force $F_{BF}$ acting on the suspension cylinders for the front wheel while the vehicle runs on the horizontal plane can be determined.

Figure 4:
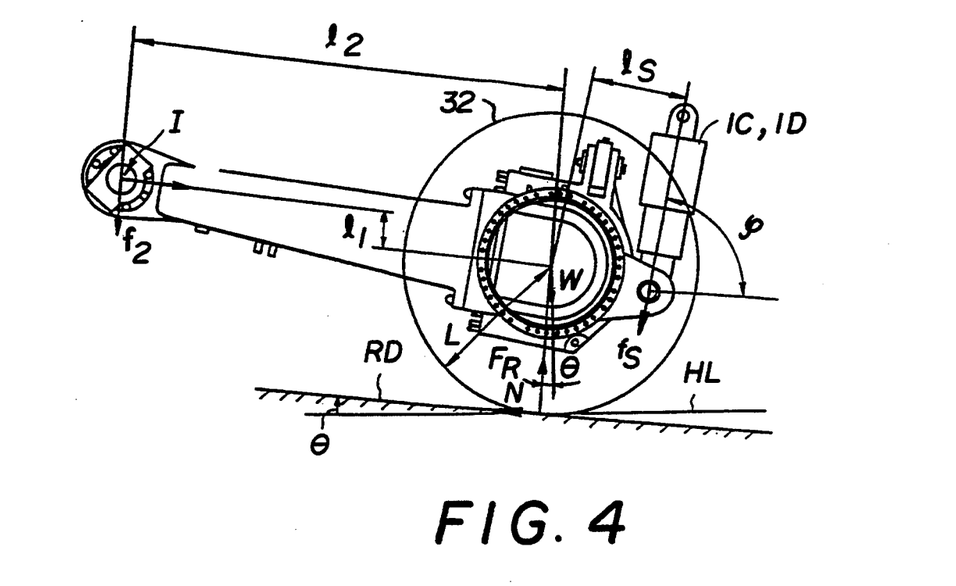
FIG. 4 is a side view of a rear-wheel suspension cylinder illustrating a principle applied to the embodiment.

Next, the suspension cylinders on the rear wheel side will be discussed below. FIG. 4 is a side view of the suspensions cylinders 1C and 1D for the rear wheels. As shown in the drawing, vehicle inclination angle, i.e., an angle defined by the horizontal plane HL and the road surface is designated by $\theta$, weight acting on each of the suspensions cylinders 1C and 1D for the rear wheels is designates by fs, directional component of the force acting on an eye point I in parallel with the road surface RD is designated by $f_1$, directional component of the force acting on the eye point I perpendicular to the road surface RD is designated $f_2$, an angle defined by axes of the suspension cylinders 1C and 1D for the rear wheels and the road surface RD is designates by $\phi$, distance between the axes of the suspension cylinders 1C and 1D for the rear wheels and the center of the rear wheels 32 is designated by Is, distance between the eye point I and the center of the rear wheels 32 as seen in the perpendicular direction (relative to the road surface RD) is designated by $I_1$, distance between the eye point I and the center of the rear wheels 32 as seen in the direction in parallel with the road surface RD is designated by 12, radius of the rear wheel is designated by L and weight of rear axles and the rear wheels 32 (weight below the spring) is designated by w. The following equation is established.

$$f_1 - fs \sin \phi + w \sin \theta - N = 0 \quad (10)$$

In addition, with respect to the direction perpendicular to the road surface, the following equation is established.

$$f_2 + fs \sin \phi + w \cos \theta - F_R = 0 \quad (11)$$

Additionally, with respect to moment, the following equation is established.

$$f_2 I_2 - f_1 I_1 - NL - Is fs = 0 \quad (12)$$

Thus, the force fs acting on the suspensions 1C and 1D for the rear wheels are expressed in the following modified manner while the following equations (10), (11), (12) and (4) are incorporated therein.

$$fs = [(F_R - w \cos \theta)I_2 - \{(W-w)I_1 + WL\}\sin \theta]/(I_2 \sin \phi + I_1 \cos \phi + Is) \quad (13)$$

Here, it is obvious that a ratio of the force fs ($\theta=0$) acting on the suspension cylinders for the rear wheels when the vehicle inclination angle $\theta$ is zero (at the time when the vehicle runs on the horizontal plane) to the force fs acting on the suspension cylinders for the rear wheels when the vehicle inclination angle $\theta$ assumes an arbitrary value is determined by the following equation.

$$fs(\theta=0)/fs = [(F_2-w)I_2/(I_2 \sin g\phi + I_1 \cos \phi + Is)]/(F_2 - w \cos \theta)I_2 - \{(W-w)I_1 + WL\}\sin \theta/(I_2 = \sin \phi + I \cos \phi + Is)] \quad (14)$$

Here, when it is assumed that the ratio fs $(\theta=0)$/fs represents a rear wheel inclination PR($\theta$) and the force $WS_R$ acting on the suspension cylinders for the rear wheels derived from the equation (2) is added to the rear wheel inclination PR($\theta$), the force $F_{BR}$ acting on the suspension cylinders for the rear wheels when the vehicle runs on the horizontal plane can be determined as noted below.

$$F_{BR} = PR(\theta) \times WS_R \quad (15)$$

Next, the relationship between the force $F_{BF}$ acting on the suspension cylinders for the front wheels and the weight $F_F$ of the vehicle on the front wheel side as well as the relationship between the force $F_{BR}$ acting on the suspension cylinders for the rear wheels and the weight $F_R$ of the vehicle on the rear wheel side will be discussed below.

Since the suspension cylinders on the front wheel side are upright standing type suspension cylinders, the weight $F_F$ of the vehicle on the front wheel side coincides with the force $F_{BF}$ acting on the suspension cylinders on the front wheels. In other words, the weight $F_F$ of the vehicle on the front wheel side can be determined by definitely adding a coefficient 1.0 to the force $F_{BF}$ acting on the suspension cylinders 1A and 1B no matter how the magnitude of weight of a load 35 on the vehicle 30 shown in FIG. 2 varies and the force acting on the suspension cylinders 1A and 1B for the front wheels correspondingly vary. Consequently, the weight $F_F$ of the vehicle on the front wheel side can be determined from the force $F_{BF}$ acting on the suspension cylinders for the front wheels by conducting the following calculation on the assumption that a link coefficient LF is a constant 1.

$$F_F = LF \times F_{BF} \quad (16)$$

Next, the suspension cylinders on the rear wheel side will be discussed below. It is obvious from the equations (7) and (15) that a ratio of the weight $F_R$ of the vehicle on the rear wheel side as measured (when the vehicle inclination angle $\theta$ is zero) to the force $F_{BR}$ acting on the suspension cylinders for the rear wheels (when the vehicle inclination angle $\theta$ is zero) is repressed by the following equation.

$$F_R/F_{BR} = \{aW/(a+b)\}/[\{(F_R-w)I_2/(I_2 \sin \phi + I_1 \cos \phi + Is)\} \quad (17)$$

As obvious from the above equation, the ratio of the weight $F_R$ of the vehicle on the rear wheel side to the force $F_{BR}$ varies depending on the magnitude of the weight W of the vehicle. In other words, the ratio of the weight $F_R$ of the vehicle on the rear wheel side to the force $F_{BR}$ varies depending not only on the weight of the load 35 on the vehicle but also on the magnitude of inclination angle $\phi$ of each cylinder shaft which varies depending on the magnitude of the weight of the load 35. For this reason, with the respect to the rear wheel side, it is necessary to determine the weight $F_R$ of the vehicle on the rear wheel side by conducting a calculation represented by the following equation on the assumption that the ratio $F_R/F_{BR}$ is incorporated in the above equation as a link coefficient PR($F_{BR}$).

$$F_R = PR(F_{BR}) \times F_{BR} \quad (18)$$

The principle which can be employed for carrying out the present invention has been described above. In practice, the embodiment of the present invention is characterized in that the force acting on the suspension cylinders for the front and rear wheels are corrected based on the equations (9) and (15) in consideration of the present inclination of the vehicle body and that the weight of the vehicle on the rear wheel side is determined based on the equation (18) at a high accuracy depending on the magnitude of each of the force acting on the suspension cylinders on the rear wheel side.

Figure 1:
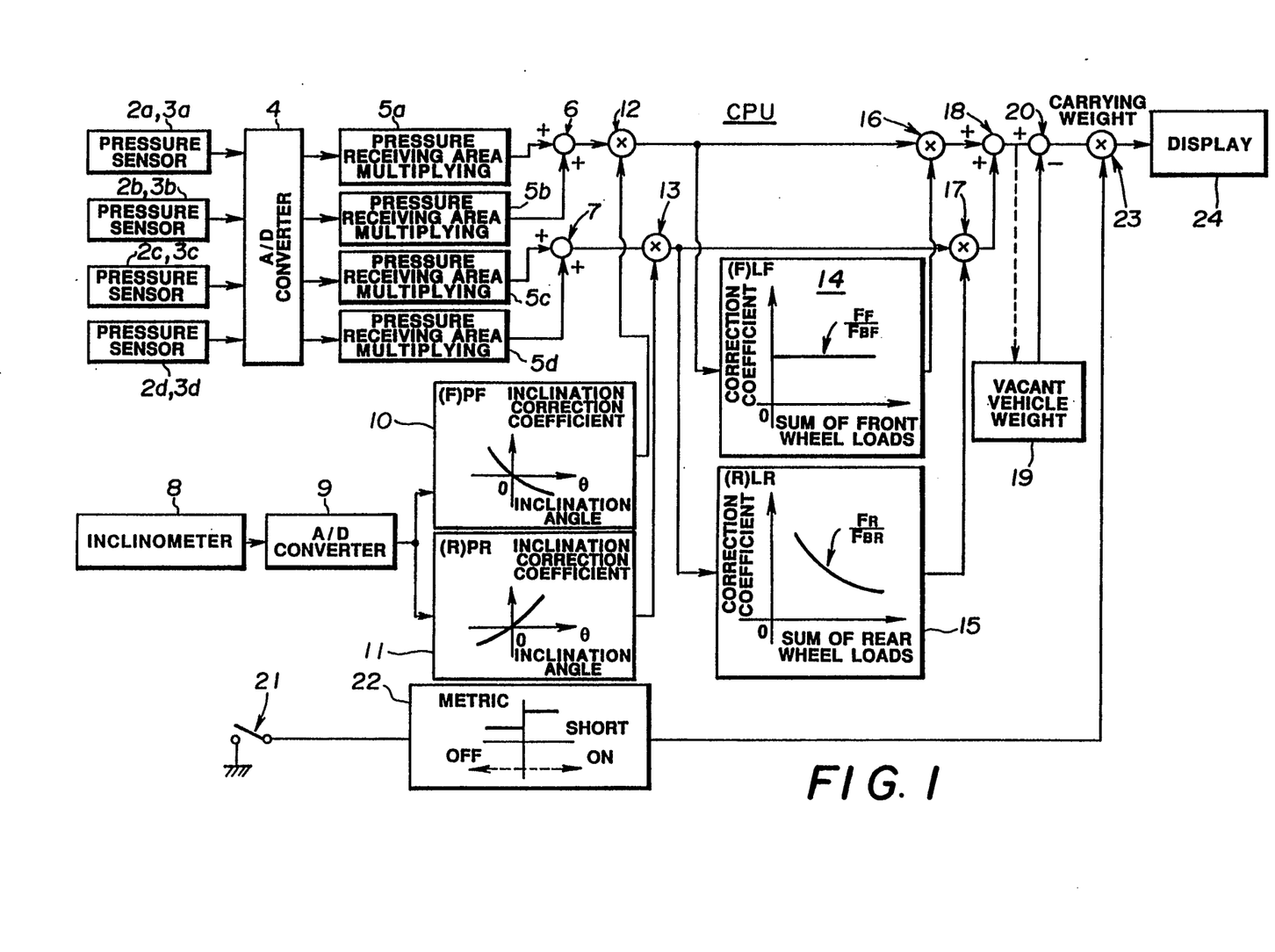
FIG. 1 is a block diagram schematically illustrating a configuration of a system for measuring carrying weight of a vehicle in accordance with an embodiment of the present invention.

FIG. 1 is a block diagram which schematically illustrates the structure of a system for measuring carrying weight of a vehicle in accordance with the embodiment of the present invention. It is assumed that the system shown in FIG. 1 is installed on the vehicle 30 such as a dump truck or the like shown in and described above with reference to FIG. 2.

Each of many systems as illustrated in FIG. 1 and constructed in accordance with the embodiment of the present invention includes as essential components sensors 2 and 3 each serving to detect pressure in a suspension cylinder 1, a group of sensors each inclusive of an inclinometer 8 arranged in a cab 33 of the vehicle 30 for detecting an inclination angle $\theta$ of the vehicle body, a weight unit shifting switch 21 disposed on, e.g., a control panel in the cab 33 for detecting an engineering unit of weight, a central processing unit (hereinafter referred to simply as CPU) adapted to execute calculation/processing to be described later not only in response to an output from each sensor but also in response to actuation for shifting of the weight unit shifting switch 21, and a display device 24 mounted at a predetermined location on the vehicle 30 for displaying on the engineering unit basis the weight of the load 35 on the vehicle 30 finally calculated by CPU.

The front wheel suspension cylinders 1A (left-hand side) and 1B (right-hand side) and the rear wheel cylinders 1C (left-hand side) and 1D (right-hand side) are equipped with pressure sensors 2a to 2d for detecting two bottom pressures $P_B$ as well as pressure sensors 3a to 3d for detecting two top pressures $P_T$. Output signals from the eight pressure sensors are transmitted into an A/D converter 4 in which they are converted into digital signals, and thereafter, the digital signals are input into CPU unit via an input/output circuit. Then, force (loads) acting on the suspension cylinders 1A, 1B, 1C and 1D are calculated in accordance with the equation (2) by pressure receiving area multiplying sections 5a, 5b, 5c and 5d.

The force acting on the suspension cylinders 1A and 1B for the front wheels are added to each other in an adder 6 so to allow the total force $WS_F$ acting on the suspension cylinders 1A and 1B to be determined. On the other hand, the force acting on the suspension cylinders 1C and 1D for the rear wheels are likewise added to each other in an adder 7 so as to allow the total force $WS_R$ acting on the suspension cylinders 1C and 1D to be determined.

The inclination angle θ of the vehicle body relative to the horizontal plane detected by the inclinometer 8 is input in an A/D converter 9 in which it is converted into a digital signal, and thereafter, the digital signal is transmitted to CPU via an input/output circuit. It is assumed that a front wheel inclination PF(θ) corresponding to the vehicle body inclination angle θ and a rear wheel inclination PR(θ) corresponding to the vehicle body inclination angle θ are stored in memories 10 and 11. In addition, it is assumed that these coefficients are previously measured not only with reference to the results derived from a variety of experiments for inclining the vehicle body but also with the results derived from simulations. For example, while the vehicle runs without any load or with a rated load placed thereon, the foregoing coefficients are previously measured with one degree in unit within the range represented by an angle θ = −10 degrees to +10 degrees and stored in the memories 10 and 11.

CPU reads from the memories 10 and 11 the front wheel inclination PF(θ) and the rear wheel inclination PR(θ) corresponding to the inclination angle θ detected by the inclinometer 8, and the calculating portions 12 and 13 execute the calculations defined in accordance with the equations (9) and (15) to determine force $F_{BF}$ acting on the suspensions cylinders for the front wheels in the horizontally converted state and force $F_{BR}$ acting on the suspension cylinders for the rear wheel in the horizontally converted state.

A link coefficient LF (=1) corresponding to the force $F_{BF}$ acting on the suspension cylinders for the front wheels and a link coefficient LR ($F_{BR}$) corresponding to the force $F_{BR}$ acting on the suspension cylinders for the rear wheels are shored in memories 14 and 15. It is recommendable that the link coefficient LR ($F_{BR}$) is previously determined corresponding to the magnitude of each of the force $F_{BR}$ by conducting, e.g., experiments and simulations for varying the vehicle weight W within the range from the vehicle weight in the vacant state to that corresponding to a rated weight×1.5 on the assumption that the inclination angle θ is zero, and the foregoing link coefficient is then stored in the corresponding memory.

CPU reads from the memories 14 and 15 the link coefficient LF and the link coefficient LF ($F_{BR}$) corresponding to the force $F_{BF}$ and $F_{BR}$, an then executes in the adders 16 and 17 the calculations as expressed by the equations (16) and (18) to determine the weight $F_F$ of the vehicle on the front wheel side and the weight $F_R$ of the vehicle on the rear wheel side.

The weight $F_F$ of the vehicle on the front wheel side and the weight $F_R$ of the vehicle on the rear wheel side calculated in the above-described manner are added to each other in an adder 18, whereby the weight W of the vehicle 30 in the loaded state is determined while it runs on the horizontal plane (on the assumption that the inclination angle θ expressed in the equation (3) is zero). In addition, CPU includes a memory 19 in which the weight $W_O$ of the vehicle 30 in the vacant state is stored (on the assumption that the inclination angle θ is zero). When the weight W of the vehicle in the loaded state is calculated, CPU reads the weight $W_O$ of the vehicle in the vacant state from the memory 19, whereby the weight WD of a load 35 on the vehicle is determined by subtracting the weight $W_O$ of the vehicle in the vacant state from the weight W of the vehicle in the loaded state in a subtracting portion 20.

On the other hand, the weight unit changing switch 21 is a switch which serves to change the weight unit to a short ton or a metric ton (equal to short ton×1.2). In case that an operator selects the short ton as a weight unit, he manually shifts the switch 21 to ON. On the contrary, in case that he selects the metric ton as a weight unit, he manually shifts the switch 21 to OFF. A signal indicating that the switch 21 is held in the ON/OFF state is input into CPU. Additionally, CPU includes a memory 22 in which a coefficient indicating the short ton corresponding to the state that the switch 21 is shifted to ON and a coefficient indicating the metric ton (<short ton) corresponding to the state that the switch 21 is shifted to OFF are stored. Then, CPU reads from the memory 22 the short ton coefficient corresponding to the state that the switch 21 is shifted to ON or the metric ton coefficient corresponding to the state that the switch 21 is shifted to OFF so that the read coefficient is added to the carrying weight WD in an adder 23.

The thus determined carrying weight WD is output to a display device 24 via a display driver or the like so that it is displayed on the screen of the display device 24 in the form of "the present carrying weight is xxxx short tons" or "the present carrying weight is xxxx metric tons".

As described above, according to the embodiment of the present invention, the vehicle weight is not determined by summing the force acting on the suspension cylinders for the front wheels and the force acting on the suspension cylinders for the rear wheels as they are but the weight of the vehicle on the front wheel side is exactly determined by conducting correction calculations corresponding to the force acting on the suspension cylinders on the front wheel side, while the weight of the vehicle on the rear wheel side is exactly determined by conductive calculations corresponding to the force acting on the suspension cylinders on the rear wheel side. Consequently, the carrying weight can be determined at a high accuracy in consideration of a manner of mounting the suspension cylinders and a magnitude of the carrying weight.

Further, according to the embodiment of the present invention, the weight unit is changed to another one by actuating the switch so that the carrying weight of the vehicle is displayed on the screen of the display device based on the changed weight unit. Consequently, an operator can visually recognize the exact weight of the load at all times even when he is exchanged with another one.

The present invention has been described above with the embodiment wherein a weight unit is changed such that one of two units is selected. It should of course be understood that the present invention may equally be applied to an embodiment where one of three or more weight units is selected.

Further, the present invention has been described above with respect to the embodiment wherein the link coefficient of the suspension cylinders for the front wheels assume a constant value. However, the present invention should not be limited only to this embodiment. Alternatively, the link coefficients of the suspension cylinders for the front wheels may be varied corresponding to the force acting on the suspension cylinders for the rear wheels in the same manner as the rear wheel side depending on a manner of supporting the suspension cylinders for the front wheels.

INDUSTRIAL APPLICABILITY

As is apparent from the above description, according to the present invention, carrying weight of a vehicle including suspension cylinders can be determined at a high accuracy. In addition, since the carrying weight of the vehicle is displayed on the screen of a display device in an arbitrary unit, an operator can visually recognize exact weight of the loads. Thus, according to the present invention, since the operator can perform a given work while exactly recognizing the carrying weight of the vehicle, durability of the vehicle can be improved, and moreover, production quantity can be exactly controlled.

What is claimed is:

1. A system for measuring carrying weight of a vehicle wherein a first force acting on front-wheel suspension cylinders of the vehicle in a loaded state and a second force acting on rear-wheel suspension cylinders of the vehicle in the loaded state are detected to determine weight of the vehicle in the loaded state based on the detected first and second forces, and carrying weight of the vehicle is determined by subtracting weight of the vehicle in a vacant state from the weight of the vehicle in the loaded state, the system comprising:
    correction value calculating means for determining a correlation between the first force and weight of the vehicle on the front wheel side on the basis of data on a front wheel suspension including mounting angles of the front-wheel suspension cylinders to the vehicle and for calculating a first correction value for determining the weight of the vehicle on the front wheel side from the first force, and for determining a correlation between the second force and weight of the vehicle on the rear wheel side on the basis of data on a rear wheel suspension including mounting angles of the rear-wheel suspension cylinders to the vehicle and for calculating a second correction value for determining the weight of the vehicle on the rear wheel side from the second force;
    correction value memory means for storing the first correction value calculated by the correction value calculating means in accordance with a magnitude of the first force and for storing the second correction value calculated by the correction value calculating means in accordance with a magnitude of the second force;
    front/rear wheel weight calculating means for reading from the correction value memory means the first correction value corresponding to the detected value of the first force and the second correction value corresponding to the detected value of the second force, and correcting the first and second forces with the read first and second correction values so as to calculate the weight of the vehicle on the front wheel side and the weight of the vehicle on the rear wheel side;
    weight memory means for storing the weight of the vehicle in the vacant state; and
    means for obtaining a sum of the weight of the vehicle on the front wheel side and the weight of the vehicle on the rear wheel side calculated by the front/rear wheel weight calculating means as weight of the vehicle in the loaded state and subtracting the weight of the vehicle in the vacant state stored in the weight memory means from the weight of the vehicle in the loaded state so as to determine the carrying weight of the vehicle.

2. A system for measuring carrying weight of a vehicle as claimed in claim 1, wherein the system including inclination angle detecting means for detecting an inclination angle of the vehicle in a front-and-rear direction, and wherein the detected first and second forces are corrected on the basis of the value detected by the inclination angle detecting means.

3. A system for measuring carrying weight of a vehicle as claimed in claim 1, wherein the system is installed in the vehicle and includes selecting means for selecting a unit of weight and display means for displaying the carrying weight of the vehicle in the unit selected by the selecting means.

4. A system for measuring carrying weight of a vehicle which comprises:
    front and rear wheel suspension means for respectively supporting front and rear wheel sides of the vehicle, the front and rear suspension means respectively including front and rear suspension cylinders mounted at an angle between the front and rear wheel sides of the vehicle and front and rear wheels of the vehicle;
    force detecting means for detecting a first force action on the front-wheel suspension cylinders of the vehicle in a loaded state and a second force acting on the rear-wheel suspension cylinders of the vehicle in the loaded state;
    correction value calculating means for determining a correlation between the first force and weight of the vehicle on the front wheel side on the basis of data including mounting angles of the front-wheel suspension cylinders to the vehicle and for calculating a first correction value for determining a weight of the vehicle on the front wheel side from the first force, and for determining a correlation between the second force and weight of the vehicle on the rear wheel side on the basis of data including mounting angles of the rear-wheel suspension cylinders to the vehicle and for calculating a second correction value for determining a weight of the vehicle on the rear wheel side from the second force;
    correction value memory means for storing the first correction value calculated by the correction value calculating means in accordance with a magnitude of the first force and for storing the second correction value calculated by the correction value calculating means in accordance with a magnitude of the second force;
    front/rear wheel weight calculating means for reading from the correction value memory means the first correction value corresponding to the detected value of the first force and the second correction value corresponding to the detected value of the second force, and correcting the first and second forces with the read first and second correction values so as to calculate the weight of the vehicle on the front wheel side and the weight of the vehicle on the rear wheel side;
    weight memory means for storing the weight of the vehicle in a vacant state; and
    means for obtaining a sum of the weight of the vehicle on the front wheel side and the weight of the vehicle on the rear wheel side calculated by the front/rear wheel weight calculating means as weight of the vehicle in the loaded state and subtracting the weight of the vehicle in the vacant state stored in the weight memory means from the weight of the vehicle in the loaded state so as to determine the carrying weight of the vehicle.

5. A system for measuring carrying weight of a vehicle as claimed in claim 4, wherein the system including inclination angle detecting means for detecting an inclination angle of the vehicle In a front-and-rear direction, and wherein the detected first and second forces are corrected on the basis of the value detected by the inclination angle detecting means.

6. A system for measuring carrying weight of a vehicle as claimed in claim 4, wherein the system is installed in the vehicle and includes selecting means for selecting a unit of weight and display means for displaying the carrying weight of the vehicle in the unit selected by the selecting means.

* * * * *